Figure 1:
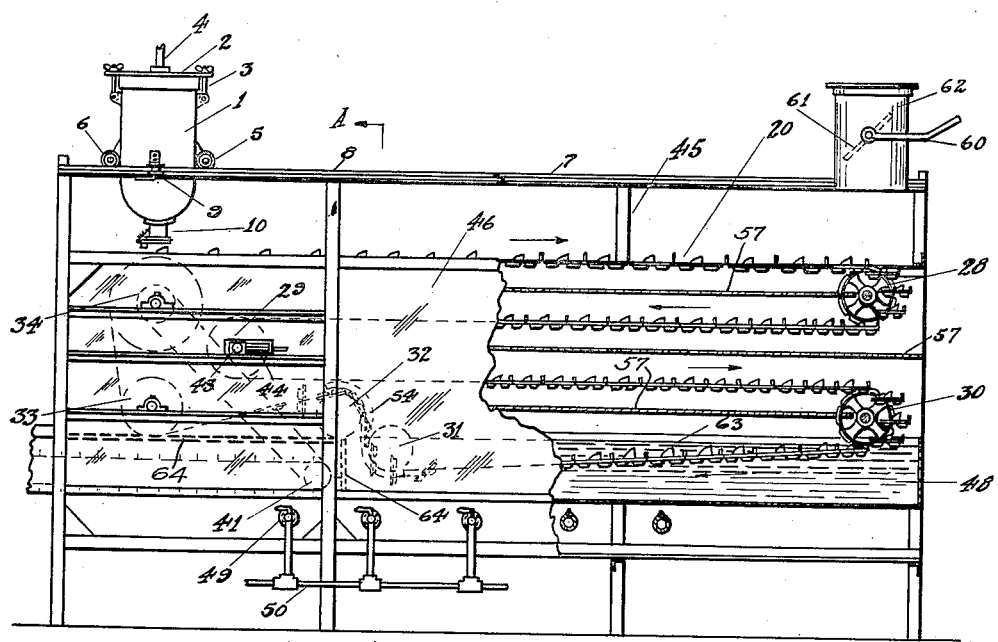
Figures 2, 3:
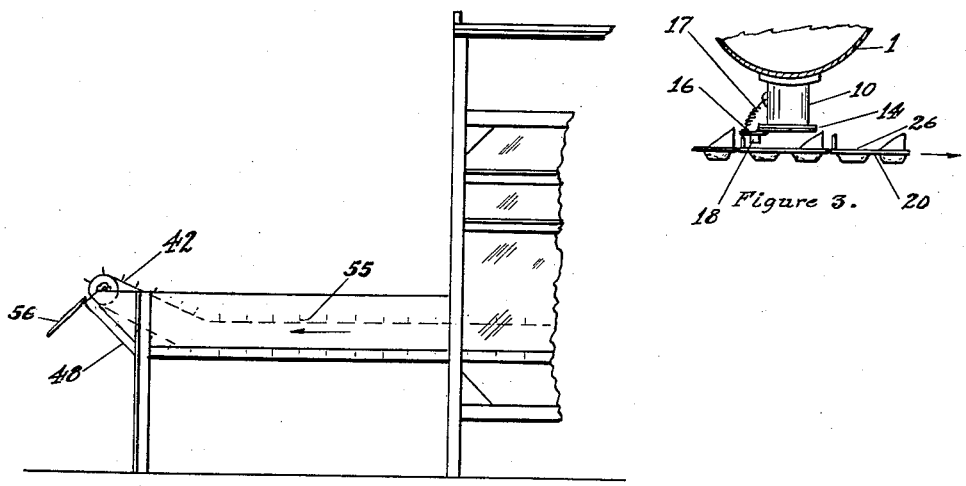
Figure 4:
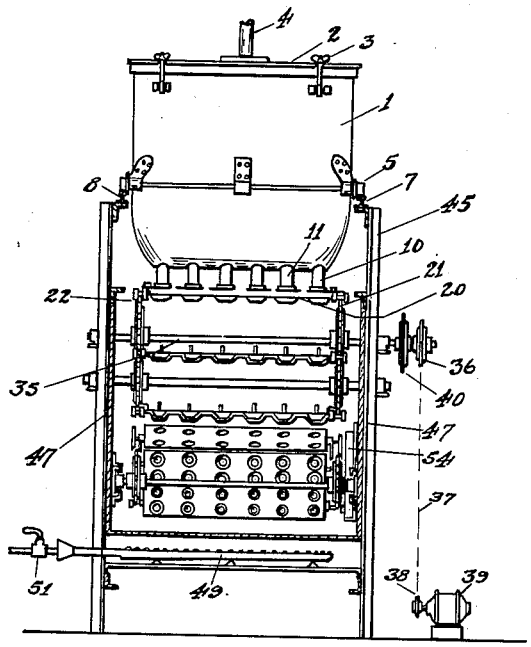
Figure 5:
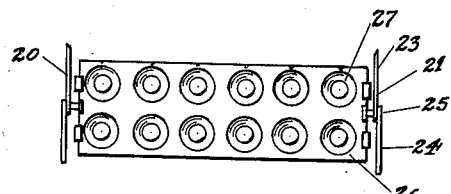
Figure 6:
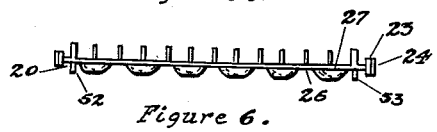
Figure 7:
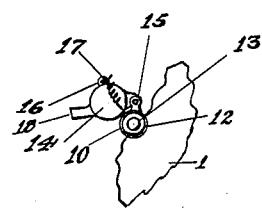

Sept. 1, 1931.  W. E. BROEG  1,821,689
PROCESS AND APPARATUS FOR PREPARING FOOD PRODUCTS
Original Filed Jan. 28, 1928   2 Sheets-Sheet 1

William Edward Broeg.
Inventor.
Attorney.

Sept. 1, 1931.   W. E. BROEG   1,821,689
PROCESS AND APPARATUS FOR PREPARING FOOD PRODUCTS
Original Filed Jan. 28, 1928   2 Sheets-Sheet 2

William Edward Broeg.
Inventor.
W. G. Darrah
Attorney.

Patented Sept. 1, 1931

1,821,689

UNITED STATES PATENT OFFICE

WILLIAM EDWARD BROEG, OF CHICAGO, ILLINOIS, ASSIGNOR TO DOUGHNUT MACHINE CORPORATION, OF NEW YORK, N. Y., A CORPORATION OF NEW YORK

PROCESS AND APPARATUS FOR PREPARING FOOD PRODUCTS

Application filed January 28, 1928, Serial No. 250,246. Renewed April 15, 1930.

This invention relates to a process and apparatus for preparing a food product, as for example doughnuts, which is formed from dough that needs to proof or rise before cooking in hot grease.

The object of this invention is to provide a process and equipment for preparing a food product of this type in an economical, efficient and satisfactory manner. Other objects of this invention are to provide equipment having a maximum capacity for a minimum investment.

Other objects of this invention will appear in the description, claims and drawings attached hereto.

Referring to the drawings:

Fig. I shows a partial side elevation, partly broken away, illustrating one form of apparatus suitable for the purposes of my invention;

Fig. II shows the extreme end portion of one form of my apparatus and is in part a continuation or extension of the left-hand end of Fig. I;

Fig. III shows a detail of the lower portion of the dough container, illustrating on a somewhat enlarged scale one of the extruding nozzles together with the means for actuating it;

Fig. IV shows a vertical end elevation, with part in section, and corresponds approximately to the device illustrated in Fig. I;

Fig. V shows a plan view of one of the holder sections or carriers, while;

Fig. VI shows an end elevation of the same device; and,

Fig. VII is a partial plan view of the nozzle and cut off device as illustrated, on an enlarged scale, in Fig. III.

Referring to the drawings, 1 indicates a container or holder in which the dough may be placed. It is preferable to use dough containing yeast, and this device is designed quite largely to make possible the use of yeast containing doughs in an automatic machine, which as far as I am aware has not hitherto been feasible.

Container 1 is provided with a cover 2 which is arranged to be held tight by any suitable means, as, for example, a series of shackle bolts with wing-nuts 3. It is desirable of course that the cover 2 be readily removable to permit cleaning, filling, inspection, etc. Container 1 is provided with a supply of compressed air by means of a pipe 4 which is shown diagrammatically as entering through cover 2 but it may, obviously, be connected at any desirable point. Pipe 4 is assumed to be connected by flexible means, or otherwise, to a source of compressed air, thus supplying means of forcing the dough out of container 1 whenever an opening is made.

Container 1 is constructed in such a manner as to be readily movable in a horizontal direction, in order to permit variation in the proofing time allowed for the dough before it is cooked.

Obviously any desired means may be provided for permitting ready movement of the container 1 and I have shown diagrammatically a series of wheels 5 and 6 attached to said container and movable along rails 7 and 8. In order to prevent undesired movement of the container 1 along rails 7, 8, I have provided a clamping member 9 which permits locking said container at any desired position.

Near the lower portion of container 1 I have provided a series of nozzles as indicated by 10, 11, etc. These nozzles 10, 11 may be constructed in any desired form, but preferably consist of an outer tube 12 with an inner core 13, so that the material which is extruded from container 1 will leave in the form of a ring and, when cut off in a horizontal plane, will take the conventional doughnut shape technically known as a torous ring.

At the lower end of nozzle 10 I have provided a cut off or cover 14 which is shown in a partially opened position in Fig. VII. This cut off or cover 14 is pivoted for rotation in a plane at right angles to the nozzle 10; and is provided with a pivot member 15 as well as an arm 16 to which is attached a spring 17, and also with a projecting cam member 18 which is placed so as to be interposed in the path of conveyor 20 travelling immediately below nozzle 10.

The direction of travel of conveyor 20 is indicated diagrammatically by arrows.

Conveyor 20 may be constructed in any desired manner. For purposes of illustration I have shown it as composed of a series of parallel chains 21 and 22 formed of a series of link members, as for example 23 and 24, pivoted at their ends to pivot 25. The pivots 25 are attached to a supporting portion 26 which has a series of depressions 27, the depressions being of the proper size and shape to receive the dough as it is cut off and falls from container nozzles 10, 11. For purposes of illustration, I have shown the depressions 27 in the form of a shallow ring adapted to hold the dough from which the doughnut is to be made.

Conveyor 20 may be arranged to travel in any of the well known ways and for purposes of illustration I have shown it passing over a series of sprockets 28, 29, 30, 31, 32, 33 and 34, so arranged that the conveyor travels a zig-zag course, making a series of back and forth passes or runs, including a lowermost "cooking" run in the grease in the tank 48, between the sprockets 30 and 31, as well as several proofing runs above the grease. These sprockets 28—34 may be of any standard construction. I have indicated sprocket 34 as the main drive sprocket, and as mounted on a shaft 35 which carries at its end a sprocket 36 arranged to be actuated by a chain 37 from sprocket 38 on motor 39. Shaft 35 also carries a sprocket 40 which may be used to actuate the shaft 41 which moves conveyor 42 employed to carry the cooked doughnuts from the tank of fat.

Sprocket 29 is carried on shaft 43 which is provided with a take-up 44 that serves to maintain the necessary tightness in the conveyor chain 20. The frame 45 provides a necessary support for the sprockets, chain, container, tank, burners, etc.; and it may be provided with panels 46 of glass, metal or other desired material, to form an enclosure over the tank 48. Insulation may be provided on a portion of the panels 46 as shown at 47 to maintain a uniform constant temperature within the enclosure and afford the most satisfactory conditions for the development of yeast in the dough.

The tank 48 is supported on frame 45 and contains liquid grease or fat maintained at the desired temperature by a series of burners 49 supplied with gas or other combustible through pipe 50, controlled by valve 51. This invention is not confined to any particular type of burner.

Because of the fact that member 26 is pivoted to conveyor chain 20 at a point above its center of gravity said member 26 is maintained in a horizontal position at all times while the dough is being proofed and for the first portion of the baking period. When the plate 26 reaches sprocket 31, however, cam members 52 and 53, Fig. VI, engage with adjustable guides 54, thus causing plate member 26 to become inverted. This throws the doughnuts out of plate 27 into the fat in the tank 48 in an inverted position. This arrangement, therefore, serves to cook both sides of the doughnuts substantially uniformly. As the plate 26 travels forward after leaving sprocket 32, it resumes its normal position by reason of the action of guide members 54, Fig. I, on cam members 52 and 53. Plate member 26 is, therefore, ready to receive other doughnuts on passing beneath the nozzles 10 after having completed its cycle. All of the plate members 26 obviously pass through a similar cycle thus ensuring continuous production of a uniform product. As the doughnuts fall into the fat held in tank 48, they are engaged by the upwardly extending prongs 55 of conveyor 42 and carried forward, for a further cooking run in the grease, in their inverted positions. Near the end of conveyor 42, the doughnuts are moved upwardly out of the fat and discharged down a slide 56 ready for placing in packages or such other operations as may be desired.

It will be evident that the equipment which I have invented provides means for varying the length of time that the dough is proofed before the doughnuts are baked. It will also be evident that this equipment provides means for varying the length of time that the doughnuts are exposed to the hot fat, and that my invention also provides means for baking both sides uniformly and consecutively.

My invention provides automatic means for producing doughnuts or other food products of this class, and is, of course, independent of the exact size, shape or type of food product.

While I have used the term doughnut in describing the operation of my invention, it is obvious that similar equipment may be applied to many other uses, although the making of doughnuts containing yeast is one of the principal objects of the invention.

It will be understood that this machine is intended to be applied to doughs which present doughnut machines cannot handle. In other words, my machine provides space and the proper time interval for permitting the yeast to rise, making a porous, spongy dough, before the baking begins. Without such provision, it is impossible to make satisfactory doughnuts from dough containing yeast. Since the action of the yeast requires varying times, owing to the amount of yeast, nature of the dough, temperature, character of the yeast and many other factors, it is quite desirable to be able to adjust the time and this I have provided by the means illustrated.

It is also desirable that an appreciable cooking time be given the conveyor 20 after leaving the bath of hot fat before reloading it with an additional charge of dough. This is to permit draining of fat or grease from the conveyor as well as proper cooling, so that the temperature of said conveyor will not adversely affect the yeast in the dough.

Using the equipment which I have described, it is possible to form the doughnuts at a continuous uniform rate from the dough in container 1. It is possible to then subject the doughnuts to an atmosphere at a controlled temperature and containing appreciable amounts of humidity. As the raw doughnuts travel away from the container 1 on conveyor 20, they are raised progressively to higher temperatures, the increase in temperature, however, being gradual and somewhat uniform. The increased temperature of course results from the approach of the conveyor 20 into closer vicinity to the heated oil in the tank 48. Control of circulation of heated air over the conveyor 20 may be obtained by any practical method, as for example by moving lever arm 60 attached to damper 61 which is located in exhaust stack 62. This arrangement also provides means for carrying away the vapors from the hot fat.

The baffles indicated by 57 between the conveyor passes serve to cause the exhaust gases to travel in a circuitous path, thus preventing sudden chilling or draft in any part of the equipment.

With this equipment, it is possible, after the dough has been subjected to the continually but gradually increasing temperature (thus giving the yeast a chance to develop), to plunge the developed dough into the hot fat in the tank 48 and carry it through said hot fat, first exposing one side to the cooking operation and then automatically inverting the doughnut and subjecting the other side to the cooking operation. The doughnut may then be removed from the hot fat.

It will be evident, therefore, that I have developed a continuous new cycle for making food articles of this type, as well as an automatic machine for carrying out said cycle.

It will be apparent that as the conveyor 20 leaves the fat bath and is gradually cooled there will be an adhering layer of fat or grease on said conveyor. This serves a useful purpose in that it makes it impossible for the dough to stick or adhere to the conveyor 20 and, therefore, assists the ready discharge of the doughnut from said conveyor at the time that the doughnut is inverted in the bath. If desired, I may provide an air blast or other means for cooling the conveyor 20 after leaving tank 48, but ordinarily this has not proven advisable, as the small amount of heat in said conveyor has assisted the proofing of the dough.

It will be apparent that by causing the warm air containing fat vapors to pass over the dough during the proofing process, there is a tendency for the fats to condense on the surface of the dough. This tends to reduce evaporation and improve the character of the dough. It also in some measure retards the escape of carbon dioxide as produced by the yeast, thus permitting more satisfactory development of the dough.

As an alternative arrangement which I have sometimes found of advantage, a partition 64 is provided laterally of tank 48 adjacent to the point at which the doughnuts are being inverted. This partition 64 is arranged substantially level with or slightly below the top line of the hot fat and serves as a division making it possible to maintain the temperature of the fat at different points on each side of the partition. It is sometimes helpful in allowing the yeast to develop while the doughnut is being cooked as it first enters the fat. To accomplish this result, it would be desirable to hold the temperature at the entering end lower than at the leaving end.

Having now fully described my invention what I claim as new and wish to secure by Letters Patent in the United States, is as follows:

1. In the manufacture of doughnuts from dough containing yeast, the method which comprises proofing doughnut formations in hot grease vapor before cooking them.

2. A method of producing food products from dough containing yeast, which method comprises subjecting portions of the dough for a proofing period to an atmosphere of hot vapors arising from hot cooking grease, and then cooking them in the grease.

3. A method of producing food products from dough containing yeast, which method comprises passing portions of the dough for a proofing period through an enclosure over a receptacle containing hot grease whence hot vapors are continually released, and then passing them through the grease and cooking them therein.

4. The process of forming yeast-containing doughnuts which consists in pressing the dough for said doughnuts from a container on to a proofing conveyor, progressing said dough for a controllable length of time by said proofing conveyor through a gradually increasing temperature so as to permit the desired development of the yeast in said dough, then passing said dough after proofing through a cooking bath, inverting said dough in the bath, and finally removing the same when cooked from said bath.

5. The process of making yeast-containing food products which consists in extruding portions of dough from a container upon a moving conveyor, subjecting said portions of dough to proofing under gradually increasing temperature to effect the desired development of the yeast, and then immersing said proofing dough portions in a cooking bath.

6. The process of making yeast-containing food products which consists in placing substantially uniform pieces of dough upon a moving conveyor, subjecting such dough pieces on said conveyor to proofing conditions under a gradually increasing temperature in the presence of a moving stream of warm air, and then passing said dough pieces through a tank containing a hot cooking liquid.

7. The process of making yeast-containing food products which consists in placing substantially uniform pieces of dough upon a moving conveyor, subjecting such dough pieces on said conveyor to proofing conditions including a variable time treatment at a gradually increasing temperature in the presence of a reversely moving flow of warm air, progressing said dough pieces through a tank containing a hot cooking liquid, inverting the same in said liquid, and then removing them from said cooking liquid.

8. The process of forming food products containing yeast which consists in placing uniform particles of dough on a moving conveyor, maintaining said particles on said conveyor while passing through a gradually increasing temperature for a controllable time to permit desired development of yeast, and then immersing said proofed particles of dough in a hot cooking bath.

9. The process of making food products from dough containing yeast which consists in placing particles of said dough on a moving conveyor, subjecting said particles of dough while on said conveyor to proofing conditions by passage through a reversely moving flow of warm gases containing fat vapors of gradually increasing temperature, and then passing said dough particles through a tank containing hot fat for cooking.

10. The process of making food products from dough containing yeast which consists in placing particles of said dough on a conveyor covered with a film of grease, subjecting the dough particles while on said film of grease to a gradually increasing temperature to proof the same, and finally immersing said conveyor with the proofed dough in a tank of hot grease to effect the cooking of said dough.

11. A machine for producing food products from dough containing yeast, said machine comprising a receptacle for hot cooking grease, an enclosure thereover, and conveyor means for passing pieces of dough first through the heated atmosphere in the enclosure above the grease, to proof them, and then through the grease to cook them.

12. A machine for producing food products from dough containing yeast, said machine comprising a receptacle for hot cooking grease, an enclosure thereover, and conveyor means for pieces of dough making a plurality of passes in said enclosure, partly above the grease and partly in it, so as first to proof the dough pieces in the heated atmosphere above the grease, and then to cook them in the grease.

13. A machine for producing food products from dough containing yeast, said machine comprising a receptacle for hot cooking grease, an enclosure thereover, and conveyor means for pieces of dough making a plurality of back and forth passes in said enclosure, partly above the grease and partly in it, baffle means between passes above the grease, and means of exit for the vapors from the upper region of the enclosure.

14. A machine for producing doughnuts from dough containing yeast, said machine comprising a receptacle for hot cooking grease, an enclosure thereover, a conveyor with means for supporting doughnut formations making a plurality of passes in said enclosure, including a proofing period above the grease and a cooking run in the grease, means for inverting the thus partially cooked doughnuts, and conveyor means for giving the inverted doughnuts a cooking run in the grease.

WILLIAM EDWARD BROEG.